Jan. 12, 1960 J. H. WHITE ET AL 2,920,575
PUMP
Filed June 3, 1957
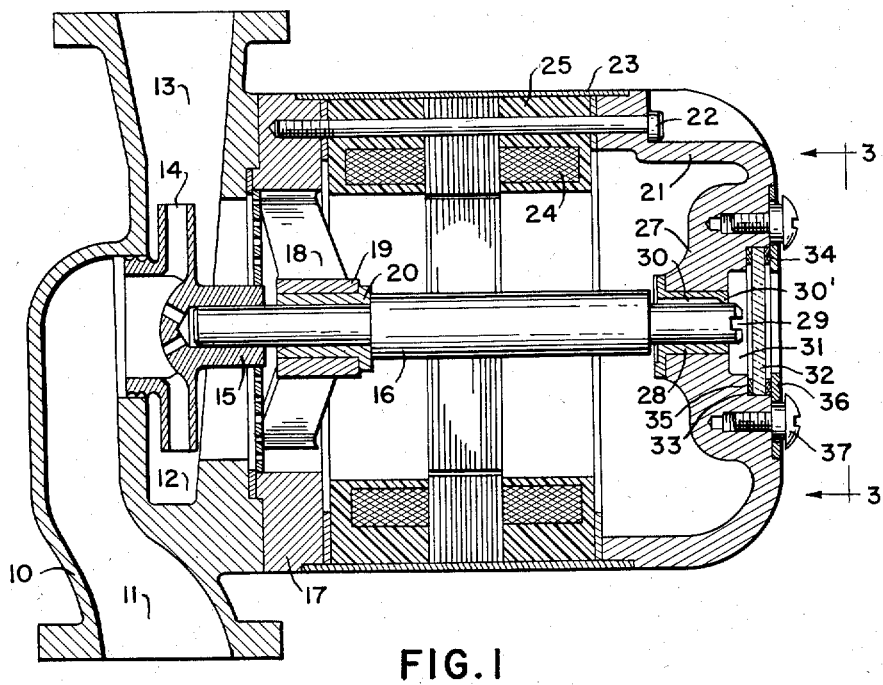
FIG. 1
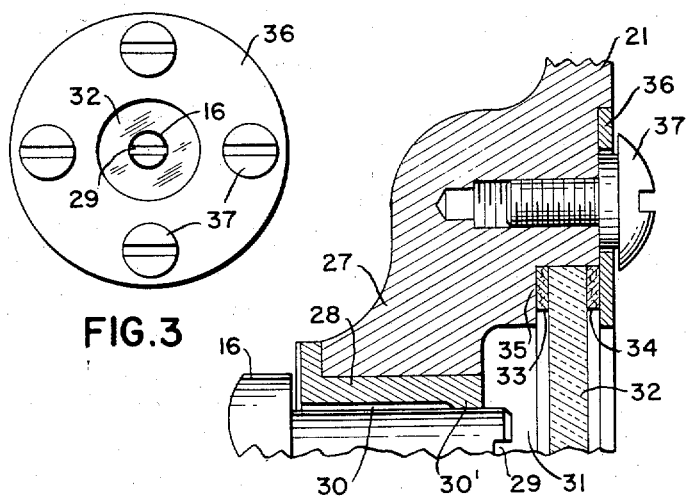
FIG. 3
FIG. 2
INVENTORS
JOHN HAZEN WHITE
THEODORE J. WOLANSKI
BY
ATTORNEYS United States Patent Office 2,920,575
Patented Jan. 12, 1960

2,920,575

PUMP

John Hazen White, Barrington, and Theodore J. Wolanski, Oaklawn, R.I., assignors to Taco Heaters, Incorporated, Cranston, R.I., a corporation of New York Application June 3, 1957, Serial No. 663,183

4 Claims. (Cl. 103—87)

This invention relates to circulating pumps, such as those adapted for use in hot water heating systems, and particularly to a totally enclosed unitary electric motor and pump combination of the type in which the pump and motor are lubricated by the liquid being pumped.

In pump and motor arrangements which are not of the unitary enclosed type, problems arise in preventing the liquid being pumped from leaking from stuffing boxes or seals through which the motor and pump shaft normally must pass. Pumps of the above-described type must operate in substantially a noiseless manner, must be capable of being readily freed in the event they become clogged by dirt or grit in the system to which they are applied, must maintain the liquid in intimate contact with the bearings to be lubricated without leaking to the atmosphere, and preferably should permit the escape of any air or gas that collects in the system since its accumulation prevents the liquid being pumped from lubricating the bearings of the motor and pump.

One of the objects of this invention is to provide an improved enclosed motor and pump combination arranged to operate without external lubrication while ensuring adequate lubrication of the bearings throughout the life of the assembly.

Another object of the invention is to provide such a combined motor and pump assembly having means for readily freeing the pump impeller in the event it becomes blocked by foreign matter.

Another object of the invention is to provide a combined pump and electric motor wherein the liquid being pumped circulates about the rotor of the motor and lubricates the bearings of the assembly, and in which any air that may be present in the pump system at any time, may be exhausted to atmosphere without permitting leakage of the liquid being pumped.

In one aspect of the invention, a liquid-tight housing may be provided with an access aperture therein and fluid inlet and outlet connections to the pump impeller which latter may preferably be of the centrifugal type. An electric motor and a rotary type centrifugal pump operated thereby may be enclosed in the housing in such a manner that the liquid being pumped may be free to pass at least over the rotor of the motor and to completely lubricate the bearings of the pump and motor shaft at all times. In order to provide for easy access to the end of the shaft so as to manually turn it in case of stoppage of the pump rotor due to dirt or foreign matter in the system, a removable liquid-tight cover plate of transparent material may be provided for a chamber in which said shaft terminates. In order to permit the escape of any gas from the system collecting in the chamber which might otherwise prevent the liquid being pumped from filling the chamber and adequately lubricating the motor and pump shaft bearings, the transparent cover plate may be sealed with a body of fibrous material. This sealing means may be designed to permit the escape of gas from the chamber and still prevent the leaking of liquid therefrom. The fibrous body preferably should be made of fibers capable upon wetting with water or the like, of swelling a major amount when unconfined. The swelling should be reasonably rapid so that when the fibrous body is confronted with water at a predetermined controlled rate, it is capable of swelling to close a passage to the atmosphere with sufficient rapidity to avoid leakage of water beyond the seal.

In a further aspect of the invention, a fiber can be employed, such as one of cellulose fiber normally used in the manufacture of paper or paper board and which has not been subsequently treated so as to reduce the swelling characteristics, such as by vulcanizing, such a fiber being termed herein an "untreated" cellulose fiber. A kraft process fiber is one example of such a fiber having unreduced swelling characteristics. Said body and fibers preferably are chosen to have at least a predetermined real volume in relation to the active or actual space occupied by the body and to have a predetermined swell rate when unconfined.

The aforementioned fibrous body when relatively dry may have intercommunicating pores therethrough which will be squeezed shut when the fibrous body absorbs water and the body is confined between the walls of a cavity or restraining structure. In a preferred form, the fibrous body fibers are in layers parallel to each other with a substantially random orientation of the fibers in said layers. The fibers are arranged substantially transverse to the passage of the water from the system.

The above as well as other objects, advantages and features of the invention will become apparent from the following description and drawings, which are merely exemplary.

In the drawings:

Figure 1 is a sectional elevational view of a pump and motor combination to which the principles of the invention have been applied;

Fig. 2 is an enlarged sectional view of a seal and chamber shown in Fig. 1; and

Fig. 3 is a reduced top plan view of the motor and pump of Fig. 1.

Referring to the drawings, a base 10 may include an inlet 11, an impeller chamber 12 and an outlet 13. A centrifugal impeller 14 may be located within the chamber 12 and it may include a hub 15 fixed to the one end of a shaft 16. A motor base 17 may be removably bolted to the base 10 by bolts (not shown). Radially disposed ribs 18 may support a boss 19 centrally of said base 17 and provide free passage of fluid through the openings between said ribs. A bearing 20 may be located in the boss 19 for journaling the shaft 16, and since the liquid being pumped will at all times surround hub 19, the bearing 20 will adequately be lubricated.

An end casing 21 may be bolted to the base 17 by long bolts 22, and a tubular member 23 may cooperate with end casing 21 and base 17 to complete the motor pump housing. A stator winding 24 may be mounted, for example, in a suitable waterproof insulating resin 25. One such resin which has been found to be of advantage is an epoxy resin. The tubular member 23 may have the stator mounted therein and the resin placed therein, the insulating resin thus being in effect part of the fluid-tight enclosure means enclosing the impeller 14, shaft 16 and stator 24. The end cap 21 may be provided with a boss 27 for supporting a bearing 28 within which the upper end of shaft 16 is journaled.

The upper end of shaft 16 may be provided with a tool engaging recess 29, such as a screw driver slot, for readily turning shaft 16 in the event impeller 14 becomes blocked due to foreign matter within the system. In order to maintain the bearing 28 adequately lubricated at all times, a groove 30 may be formed in the inner peripheral surface of the bearing 28. This groove 30 may not extend throughout the length of bearing 28 and the wall 30' at the end of the groove may restrict the flow of liquid beyond the bearing 28 to a restricted extent for a purpose to be described later.

The end cap 21 may also be provided with a cavity or chamber 31 surrounding the upper end of the shaft 16, and it may be closed by a transparent closure 32 by a joint that will permit the escape of accumulated gas therein without permitting the escape of the liquid within the system. In the present invention, annular discs 33 and 34 may be located on both sides of the transparent closure 32. The disc 33 may rest on a shoulder 35 formed in the end cap 21, while a retaining plate 36 may retain the annular disc 34 against the closure 32 by shouldered screws 37 which provide a slight clearance between their heads and the retaining plate 36. In one type of satisfactory fibrous body, the fiber is medium well cooked and beaten, and the board made on a wet machine. The fibers preferably are arranged in parallel layers, said layers preferably having the fibers randomly oriented in each layer. Fibrous bodies found to be satisfactory may have apparent densities of from 0.80 to 1.40, and, an initial swell rate for the first minute of more than 20% when exposed to water and when the body is unrestrained. As one example of a suitable fiber, the initial swell rate is 20% for the first minute. The same fiber will swell 70% in five minutes. This fiber is a kraft process fiber made as indicated. The swell rate is not necessarily a straight line relationship but should be rapid or quick the first minute. The particular swell rate also is related to the real volume of the fibers.

The fibrous discs 33 and 34 when first placed in the assembly need not provide a tight fit, but after becoming wet, they swell and prevent the passage of liquid within the system to the atmosphere. Prior to becoming wet, the discs 33 and 34 permit the exhaust of any air or gas that may accumulate in the chamber 31 which, if not permitted to escape, would prevent the liquid within the system from adequately lubricating the bearing 28. The restriction to the flow of liquid into chamber 31, afforded by the wall 30' at the end of slot 30, may permit the fibrous discs 33 and 34 to swell and seal off the closure 34 before liquid leaks therefrom, while still venting any collected gas within chamber 31 to the atmosphere.

Various modifications can be made in the details of construction described herein, without departing from the spirit of the invention, except as defined in the appended claims.

What is claimed is:

1. A unitary liquid pump and motor device having a housing means with liquid inlet and outlet connections and an impeller chamber between said inlet and outlet connections, said housing having an opening thereto from the exterior thereof, said housing having a marginal surface around said opening of larger diameter than said opening and angularly disposed relative to the axis thereof, an impeller within said impeller chamber, a drive shaft connected to said impeller, motor armature means connected to said drive shaft, said housing means having a cavity therein, said armature means being located in said cavity in liquid communication with said impeller chamber, a stator for said motor having means for water sealing it from said cavity, journal means for said drive shaft supported within said housing means, closure means for said opening mounted on said outside marginal surface, said closure means being dimensioned so that there is axial space between said closure means and said marginal surface so that fluid can flow between said closure means and said opening, and fibrous body means between said closure means and said outside marginal surface, said fibrous body means having an axial thickness less than that of said axial space between said marginal surface and said closure means when said fibrous body is relatively dry and having a swell rate which is relatively large with respect to the axial dimension of said axial space, so that said fibrous means will vent gases accumulating in said housing and will swell axially relative to said opening to close said axial space between said closure means and said marginal surface when liquid comes into contact therewith at a rate which will prevent a substantial escape of liquid through said opening.

2. A unitary liquid pump and motor device having a housing means with liquid inlet and outlet connections and an impeller chamber between said inlet and outlet connections, said housing having an opening thereto from the exterior thereof, said housing having a marginal surface around said opening of larger diameter than said opening and angularly disposed relative to the axis thereof, an impeller within said impeller chamber, a drive shaft connected to said impeller, motor armature means connected to said drive shaft, said housing means having a cavity therein, said armature means being located in said cavity in liquid communication with said impeller chamber, a stator for said motor having means for water sealing it from said cavity, journal means for said drive shaft supported within said housing means, closure means for said opening mounted on said outside marginal surface, said closure means being dimensioned so that there is axial space between said closure means and said marginal surface so that fluid can flow between said closure means and said opening, fibrous body means between said closure means and said outside marginal surface, said fibrous body means having an axial thickness less than that of said axial space between said marginal surface and said closure means when said fibrous body is relatively dry and having a swell rate which is relatively large with respect to the axial dimension of said axial space, so that said fibrous means will vent gases accumulating in said housing and will swell axially relative to said opening to close said axial space between said closure means and said marginal surface when liquid comes into contact therewith at a rate which will prevent a substantial escape of liquid through said opening, and retaining ring means for holding said fibrous body means and closure means in assembled relation.

3. A unitary liquid pump and motor device having a housing means with liquid inlet and outlet connections and an impeller chamber between said inlet and outlet connections, said housing having an opening thereto from the exterior thereof, said housing having a marginal surface around said opening of larger diameter than said opening and angularly disposed relative to the axis thereof, an impeller within said impeller chamber, a drive shaft connected to said impeller, motor armature means connected to said drive shaft, said housing means having a cavity therein, said armature means being located in said cavity in liquid communication with said impeller chamber, a stator for said motor having means for water sealing it from said cavity, journal means for said drive shaft supported within said housing means, one of said journal means being connected to said opening and supporting one end of said shaft, closure means for said opening mounted on said outside marginal surface, said closure means being dimensioned so that there is axial space between said closure means and said marginal surface so that fluid can flow between said closure means and said opening, and fibrous body means between said closure means and said outside marginal surface, said fibrous body means having an axial thickness less than that of said axial space between said marginal surface and said closure means when said fibrous body is relatively dry and having a swell rate which is relatively large with respect to the axial dimension of said axial space, so that said fibrous means will vent gases accumulating in said housing and will swell axially relative to said opening to close said axial space between said closure means and said marginal surface when liquid comes into contct therewith at a rate which will prevent a substantial escape of liquid through said opening.

4. A unitary liquid pump and motor device having a housing means with liquid inlet and outlet connections and an impeller chamber between said inlet and outlet connections, said housing having an end wall with an opening thereto from the exterior thereof, said housing having a marginal surface around said opening of larger diameter than said opening and angularly disposed relative to the axis thereof, an impeller within said impeller chamber, a drive shaft connected to said impeller, motor armature means connected to said drive shaft, said housing means having a cavity therein, said armature means being located in said cavity in liquid communication with said impeller chamber, a stator for said motor having means for water sealing it from said cavity, journal means for said drive shaft supported within said housing means, one of said journal means being connected to said opening and supporting one end of said shaft, a tool engaging recess in said one end of said shaft accessible from said opening, transparent closure means for said opening mounted on said outside marginal surface, said closure means being dimensioned so that there is axial space between said closure means and said marginal surface so that fluid can flow between said closure means and said opening, and fibrous body means between said closure means and said outside marginal surface, said fibrous body means having an axial thickness less than that of said axial space between said marginal surface and said closure means when said fibrous body is relatively dry, and having a swell rate which is relatively large with respect to the axial dimension of said axial space, so that said fibrous means will vent gases accumulating in said housing and will swell axially relative to said opening to close said axial space between said closure means and said marginal surface when liquid comes into contact therewith at a rate which will prevent a substantial escape of liquid through said opening.

References Cited in the file of this patent

UNITED STATES PATENTS

| | | |
|---|---|---|
| 2,756,680 | Rutschi | July 31, 1956 |
| 2,771,311 | Hottenroth | Nov. 20, 1956 |

FOREIGN PATENTS

| | | |
|---|---|---|
| 85,446 | Norway | Feb. 26, 1955 |
| 697,634 | Great Britain | Sept. 23, 1953 |